United States Patent
Kessler

[11] Patent Number: 5,867,867
[45] Date of Patent: Feb. 9, 1999

[54] PAN HANDLE HAND GRIP

[75] Inventor: William I. Kessler, Sheboygan, Wis.

[73] Assignee: The Vollrath Company, Inc., Sheboygan, Wis.

[21] Appl. No.: 971,876

[22] Filed: Nov. 19, 1997

Related U.S. Application Data

[63] Continuation of Ser. No. 640,455, May 1, 1996, abandoned.

[51] Int. Cl.⁶ ..................................................... A47B 95/02
[52] U.S. Cl. ................ 16/110 A; 16/116 R; 16/DIG. 12; 220/753
[58] Field of Search .............................. 16/110 A, 116 R, 16/116 A, 114 A, DIG. 12; D8/107; D7/688, 691, 368, 369, 393, 395; 220/755, 753

[56] References Cited

U.S. PATENT DOCUMENTS

| | | |
|---|---|---|
| D. 258,861 | 4/1981 | Bratton . |
| D. 266,895 | 11/1982 | Hellinger . |
| D. 266,896 | 11/1982 | Hellinger . |
| D. 283,188 | 4/1986 | Pool . |
| 1,712,675 | 5/1929 | Olsen . |
| 1,728,619 | 9/1929 | Lambert . |
| 1,730,820 | 10/1929 | Holden . |
| 1,837,109 | 12/1931 | Burvenick . |
| 2,133,252 | 10/1938 | Moore et al. . |
| 2,140,157 | 12/1938 | Huffman . |
| 2,144,474 | 1/1939 | Woodman . |
| 2,246,393 | 6/1941 | Sperry . |
| 2,254,571 | 9/1941 | Hailey . |
| 2,520,808 | 8/1950 | Miller . |
| 4,197,611 | 4/1980 | Bell et al. . |
| 4,413,767 | 11/1983 | Hellinger . |
| 4,491,235 | 1/1985 | Fournier . |
| 4,768,427 | 9/1988 | Cheng . |
| 5,447,351 | 9/1995 | Klunder . |

FOREIGN PATENT DOCUMENTS

| | | |
|---|---|---|
| 597085 | 4/1934 | Germany . |
| 246298 | of 0000 | Italy . |

*Primary Examiner*—Chuck Y. Mah
*Attorney, Agent, or Firm*—Foley & Lardner

[57] ABSTRACT

A hand grip formed or molded on the handle for a cooking utensil for preventing peeling of the inner end of the hand grip from the handle and thereby limiting the migration of food particles into the space between the hand grip and the handle, the hand grip being molded onto the handle and interconnected through one or more openings in the inner end of the handle.

20 Claims, 2 Drawing Sheets

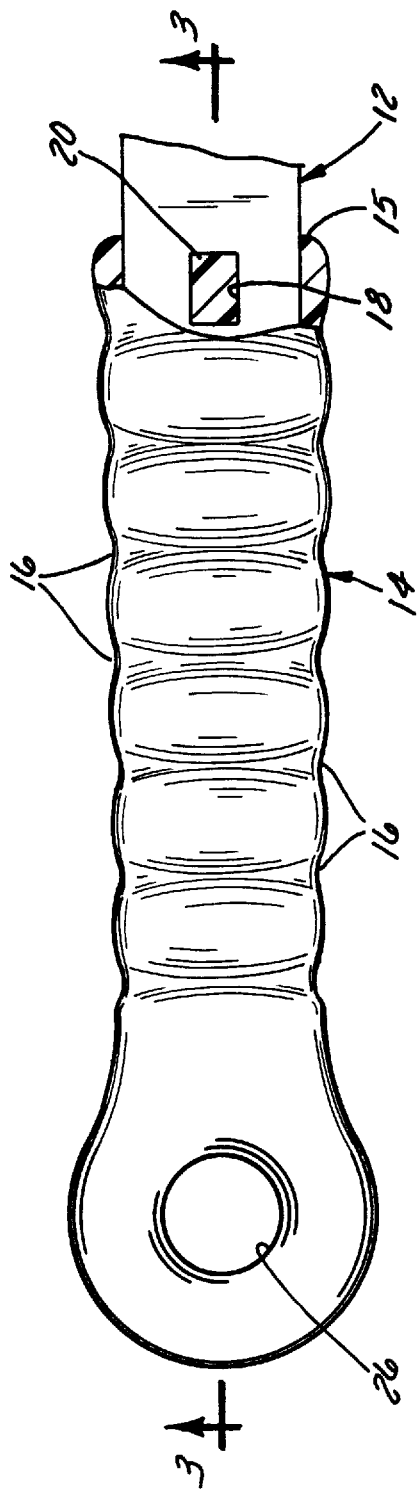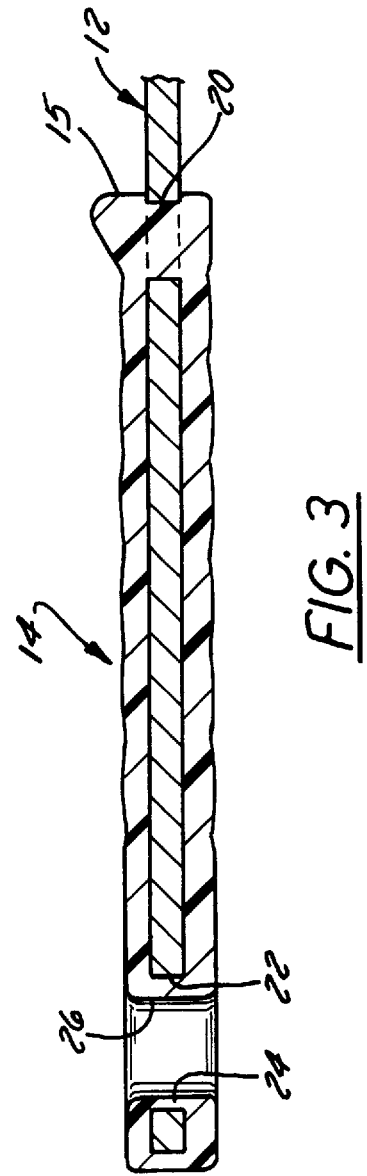

PAN HANDLE HAND GRIP

RELATED APPLICATION

This application is a continuation of prior application Ser. No. 08/640,455, filed May 1, 1996, entitled "Pan Handle Hand Grip." Now abandoned.

FIELD OF THE INVENTION

The present invention relates to commercial cooking utensils and more particularly to a hand grip formed on the cooking utensil handle which prevents the ingress of foreign matter between the handle and the hand grip.

BACKGROUND OF THE INVENTION

Pots and pans in commercial kitchens are used for prolonged periods of time at high temperatures. It is, therefore, necessary to provide a hand grip on the handle to prevent the cook from burns. A typical hand grip is shown in U.S. Pat. No. 4,197,611, issued on Apr. 15, 1980, and entitled "Hand Grip For Cooking Utensil Handle." The hand grip is generally designed to be loosely mounted on various size handles. However sanitary rules and/or regulations require a tight fit to prevent food particles from migrating into the space between the handle and the hand grip.

SUMMARY OF THE PRESENT INVENTION

In accordance with the present invention a permanent hand grip for cooking utensils is molded directly onto the metal handles of cooking utensils of varying lengths and shapes.

It is a further object of the present invention to provide a resilient hand grip having low thermal conductivity to provide a cool gripping surface even after prolonged heating of the utensil.

A further object of the present invention is to provide a resilient hand grip which can be molded through an opening in the handle, located in close proximity to the pan, to prevent the hand grip from peeling away from the handle and thereby allowing for the migration of food particles under the inner end of the hand grip.

A still further object is the provision of an opening in the hand grip on the outer end of the handle which can be used to hang the cooking utensil as well as preventing longitudinal movement of the cover on the handle.

The hand grip according to the present invention is formed or molded directly onto the metal handle of commercial cookware. The hand grip is preferably made of silicon rubber and is formed directly onto the handle. The handle is provided with an opening or slot located in close proximity to the pan which allows the silicon rubber to flow through the slot to form a mechanical connection between the top and bottom of the hand grip in order to help prevent foreign matter from migrating between the end of the hand grip and the handle. The hand grip may also include a connection through an opening in the outer end of the handle as well as an opening through the connection of the hand grip for hanging the handle on a hook.

Other principal features and advantages of the invention will become apparent to those skilled in the art upon review of the following drawings, the detailed description and the appended claims.

BRIEF DESCRIPTION OF THE DRAWINGS

FIG. 2 is a top view of the cover partially broken away to show the internal connection of the hand grip at the inner end of the handle;

FIG. 3 is a cross section view taken on line 3—3 of FIG. 2;

Figure 1:
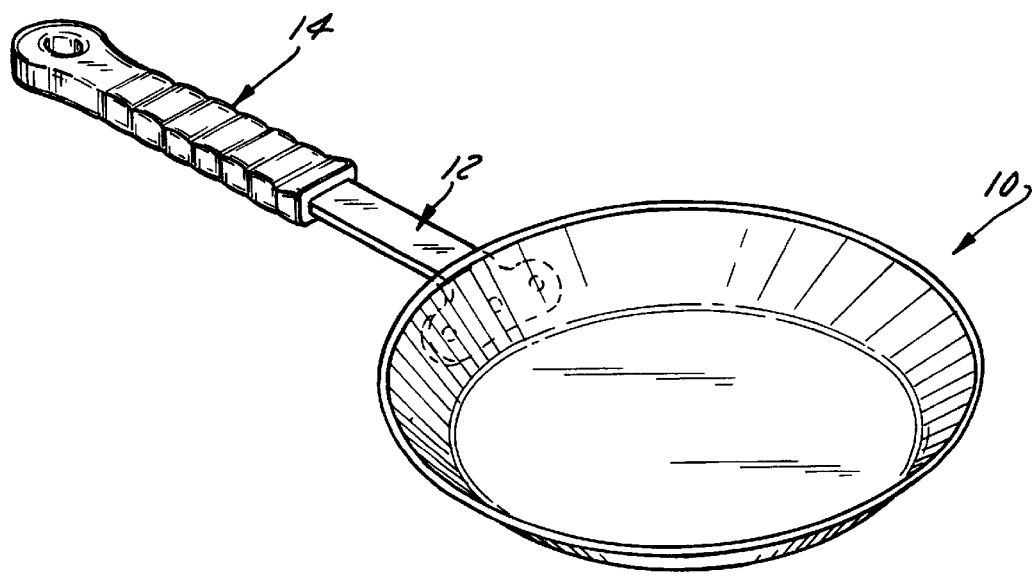
FIG. 1 is a perspective view of a cooking utensil having a resilient cover molded onto the handle.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Referring to the drawings and more particularly to FIG. 1, a pan or skillet 10 is shown having a handle 12 which is riveted to one side of the pan or skillet. In accordance with the present invention a hand grip 14 is molded directly onto the handle 12 to thereby prevent peeling of the end of the hand grip away from the handle.

In this regard, the hand grip 14 is preferably made of silicon rubber which has a low thermal conductivity characteristic and good water repellency. The hand grip 14 includes a number of indentations 16 around the outer surface thereof to provide a gripping surface for the user. In order to prevent food particles collecting on the handle 12 from migrating under the inner end 15 of the hand grip a hole 18 is provided in the handle in close proximity to the pan or skillet. The silicon rubber flows through the opening 18 to form a connection 20 between the top and bottom of the hand grip which prevents the inner end of the grip from peeling and thereby preventing the ingress of foreign matter under the end of the hand grip. With this arrangement, it is virtually impossible for food particles to migrate under the end of the hand grip 14.

A second opening 22 may be provided on the outer end of the handle 12 to allow for a second connection 24 to be formed in the opening 22 to prevent the hand grip 14 from sliding on the handle. The second connection 24 is provided with an opening 26 for hanging the pot or pan on a hanger.

Figure 4:
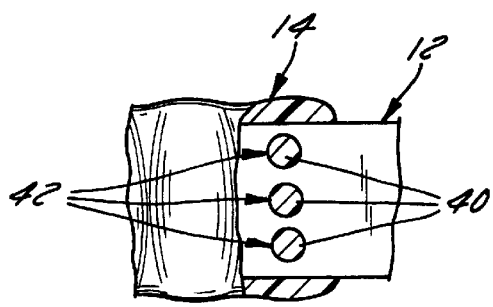
FIG. 4 is a view of the inner end of the handle, partly broken away to show an alternate form of connection of the hand grip to the handle.
Figure 5:
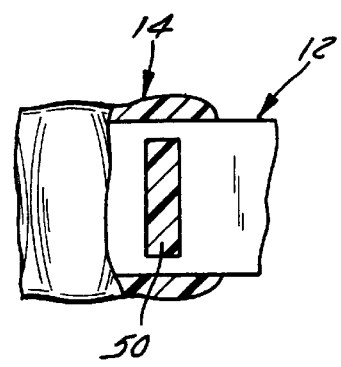
FIG. 5 is a view similar to FIG. 4 showing another alternate form of connection of the hand grip to the handle.

Alternate embodiments of the invention are shown in FIGS. 4 and 5 wherein various shaped openings are provided for connecting the inner end of the hand grip to the handle. In this regard in FIG. 4 a number of circular openings 40 are provided in the handle in close proximity to the pan or skillet, through which a number of rubber connections 42 are formed. The openings are aligned in a transverse relation to the axis of the handle thereby connecting the top and the bottom of the inner end of the hand grip to the handle.

In FIG. 5, another form of connection is shown interconnecting the top and bottom of the hand grip in the form of a rectangular connection 50 molded transverse to the handle 12. With this arrangement a greater cross section of the handle is closed to the migration of food particles under the hand grip.

Thus, it should be apparent that there has been provided in accordance with the present invention a pan handle hand grip that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A metal handle for a cooking utensil having an inner end and an outer end and a hand grip to provide tactile comfort including heat insulation to the cooking utensil user, the metal handle including at least one opening on the inner end of the metal handle to anchor the hand grip against the metal handle for preventing food particles accumulating on the metal handle from migrating under the hand grip, the hand grip comprising:

a resilient silicon rubber hand grip molded onto the metal handle, the hand grip having a first end and a second end, the hand grip extending from the outer end of the metal handle to a position in close proximity to the inner end of the metal handle and a connection formed by the silicon rubber material through the opening in the inner end of the handle, the second end of the hand grip being adjacent the opening.

2. The hand grip according to claim 1, wherein the connection is in the form of a rectangle having a longitudinal axis parallel with the handle.

3. The hand grip according to claim 1, wherein the connection is in the form of a rectangle having a longitudinal axis formed at a right angle to the axis of the handle.

4. A handle assembly for a cooking utensil having an inner end and an outer end and a heat resistant hand grip molded on the handle to provide tactile comfort, including heat insulation to the cooking utensil user, at least one opening in the inner end of the handle, a silicon rubber hand grip molded on the handle from the outer end of the handle to the inner end of the handle and joined at the inner end through the opening provided in the handle adjacent an inner end of the hand grip thereby anchoring the hand grip against the handle in that area to prevent the ingress of foreign material between the inner end of the hand grip and the surface of the handle.

5. The hand grip according to claim 4 wherein the opening is in the form of a rectangle having an axis parallel to the axis of the handle.

6. The hand grip according to claim 4 wherein the opening is in the form of a rectangle having an axis transverse to the axis of the handle.

7. A handle assembly for a cooking utensil comprising:

a handle having an outer end, an inner end, and at least one opening extending therethrough located a predetermined distance from the outer end;

a resilient hand grip molded onto the handle and through the opening, the hand grip having a first end proximate the outer end of the handle and a second end adjacent the opening to hold the second end of the resilient hand grip against the handle to prevent the ingress of foreign material between the second end of the hand grip and the handle.

8. The handle assembly of claim 7, wherein the resilient hand grips formed from silicon rubber.

9. The handle assembly of claim 8, wherein the opening has a cross sectional area sufficient to prohibit the second end of the hand grip from being peeled away from the handle.

10. The handle assembly of claim 9, wherein the at least one opening includes a number of openings aligned transverse to the handle adjacent the second end of the hand grip.

11. The handle assembly of claim 9, wherein the opening is in the form of a rectangle having an axis parallel to the axis of the handle.

12. The handle assembly of claim 9, wherein the opening is in the form of a rectangle having an axis transverse the axis of the handle.

13. The handle assembly of claim 7, wherein the handle is a unitary member.

14. A handle assembly for a cooking utensil comprising:

a handle having an outer end, an inner end, and at least one opening extending therethrough located a predetermined distance from the outer end;

a resilient hand grip molded onto the handle and through the opening, the hand grip having a first end proximate the outer end and a second end being sufficiently close to the opening to prevent the second end of the hand grip from being peeled away from the handle to prohibit the ingress of foreign material between the hand grip and the handle.

15. The handle assembly of claim 14, wherein the resilient hand grip is formed from silicon rubber.

16. The handle assembly of claim 14, wherein the opening is adjacent the second end of the hand grip.

17. The handle assembly of claim 16, wherein the at least one opening includes a number of openings aligned transverse to the axis of the handle adjacent the second end of the hand grip.

18. The handle assembly of claim 16, wherein the opening is in the form of a rectangle having an axis parallel to the axis of the handle.

19. The handle assembly of claim 16, wherein the opening is in the form of a rectangle having an axis transverse the axis of the handle.

20. The handle assembly of claim 14, wherein the handle is a unitary member.

* * * * *

UNITED STATES PATENT AND TRADEMARK OFFICE
CERTIFICATE OF CORRECTION

PATENT NO. : 5,867,867
DATED : February 9, 1999
INVENTOR(S) : William I. Kessler It is certified that error appears in the above-identified patent and that said Letters Patent is hereby corrected as shown below:

On the Title Page: [73] Assignee: Line 1 delete

"The Vollrath Company, Inc." and substitute

--The Vollrath Company, L.L.C.--.

Signed and Sealed this

Seventeenth Day of April, 2001

Attest:

NICHOLAS P. GODICI

Attesting Officer     Acting Director of the United States Patent and Trademark Office